United States Patent Office 3,790,493
Patented Feb. 5, 1974

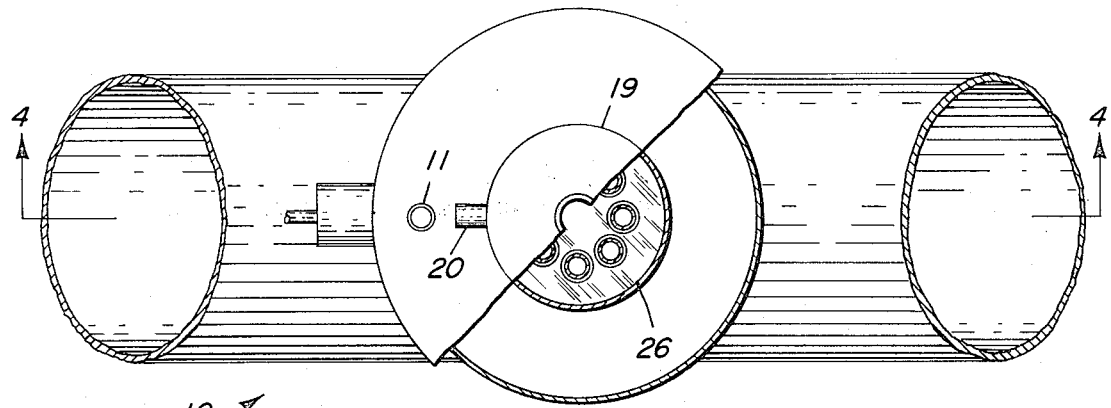
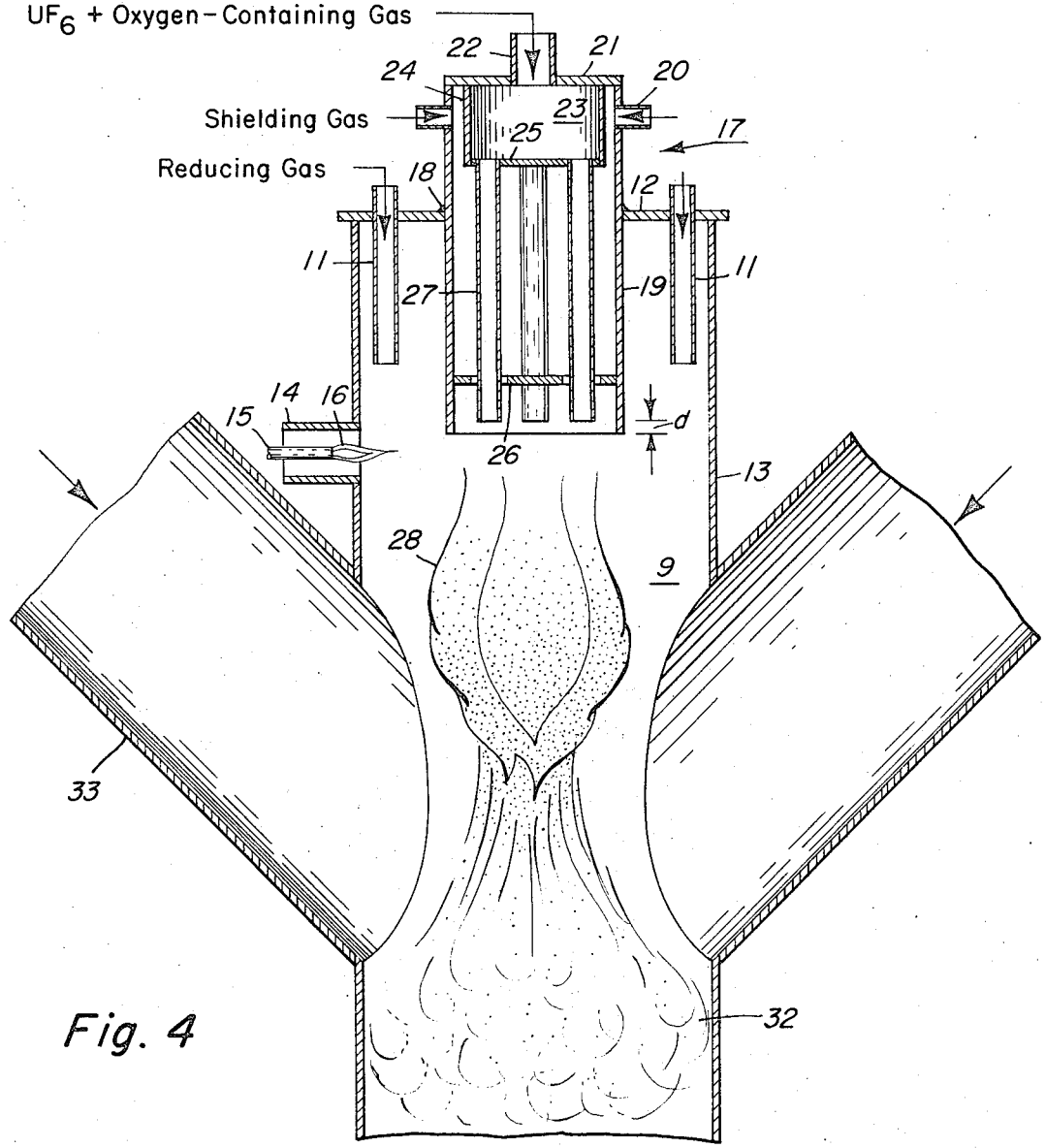

3,790,493
POST OXIDATION PROCESS FOR URANIUM
DIOXIDE RICH COMPOSITIONS
Abdul G. Dada, William R. De Hollander, and Robert
J. Sloat, San Jose, Calif., assignors to General Electric
Company
Filed Apr. 6, 1971, Ser. No. 131,685
Int. Cl. C01g 43/02
U.S. Cl. 252—301.1 R                      42 Claims

ABSTRACT OF THE DISCLOSURE

This invention presents a process for conversion of gaseous uranium hexafluoride to an oxide product of uranium by introducing to a reaction zone in the presence of an active flame maintained in the reaction zone a first gaseous reactant comprising a mixture of uranium hexafluoride and an oxygen-containing carrier gas and a second gaseous reactant comprising a reducing gas and temporarily separating the first and second gaseous reactants with a shielding gas which temporarily prevents substantial mixing and reaction between these gaseous reactants. The first and second gaseous reactants ultimately react to give a particulate uranium dioxide rich composition in the presence of residual reducing gas. An oxygen-containing gas as a third gaseous reactant is introduced at a time when the uranium hexafluoride conversion to the uranium dioxide rich composition is substantially complete. This results in oxidizing the uranium dioxide rich composition to a higher oxide of uranium with conversion of the residual reducing gas to its oxidized form. This process is adaptable to yield oxide products of uranium in any state of oxidation between uranium dioxide ($UO_2$) and uranium tritaoctoxide ($U_3O_8$).

BACKGROUND OF THE INVENTION

Figure 1:
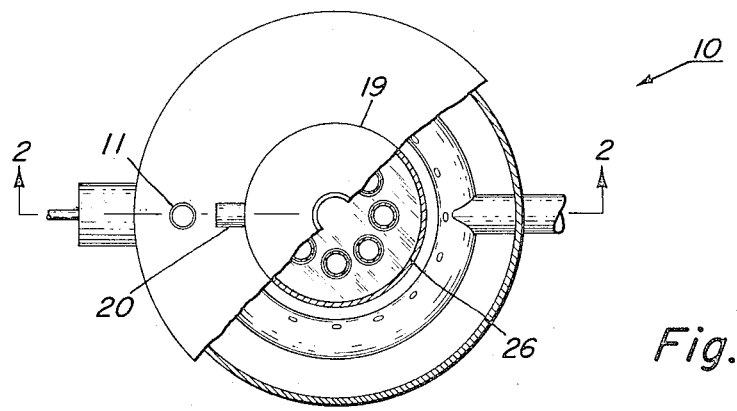

Oxide products of uranium have various utilities including preferred utilities as catalysts and fuels for nuclear reactors in the nuclear industry.

The performance of the fuel elements, traditionally enriched uranium dioxide structures clad in a metal container, is crucial to the practical success of the nuclear reactor. Nuclear power generation has imposed severe requirements on the performance of fuel in nuclear reactors, especially on properties of grain size and density of the fuel. It has been demonstrated that fine grain uranium dioxide structures are more subject to creep than large grain uranium dioxide structures. It has also been discovered that the density of the uranium dioxide is a very important physical property influencing the performance of the fuel. In fabricated forms, uranium dioxide is a ceramic capable of compaction to give a structure of desired density and a low impurity level.

The enrichment of uranium customarily takes place through use of the compound uranium hexafluoride so that a process is required for converting the enriched uranium hexafluoride into enriched uranium dioxide in a form which can be readily fabricated to structures having a low fluoride content and a desired density and grain size.

Current practice for converting uranium hexafluoride to an oxide product of uranium, usually uranium dioxide, employs hydrolysis of uranium hexafluoride to give a solution of uranyl fluoride and hydrogen from which ammonium diuranate is precipitated by the addition of ammonia. After filtration the ammonium diuranate of high fluoride content is dissolved in nitric acid with fluoride decontamination of the resulting uranyl nitrate solution being accomplished by solvent extraction. From the resulting purified uranyl nitrate solution, ammonium diuranate is reprecipitated and then calcined to give $U_3O_8$ which in turn is reduced with hydrogen to give uranium dioxide.

Attempts have been made to replace this involved, expensive ammonium diuranate conversion process by gas phase reaction of uranium hexafluoride with a very successful method being described in copending U.S. patent application Ser. No. 77,446 entitled Process for Producing Uranium Dioxide Rich Compositions From Uranium Hexafluoride which is hereby incorporated by reference. The foregoing application was filed Oct. 2, 1970 in the names of W. R. De Hollander and A. G. Dada and assigned to the same assignee as the present invention.

The practice of the process of U.S. patent application Ser. No. 77,446 gives a uranium dioxide rich composition having particularly desirable properties and a gaseous atmosphere rich in reducing gas such as hydrogen. Since it is known that certain gaseous mixtures of a reducing gas such as hydrogen and air can be readily combustible and potentially explosive, it has been found desirable to convert any such gaseous mixture to its oxidized form during this process. Further a process sequence having a by-product gaseous atmosphere rich in a reducing gas such as hydrogen makes it undesirable to practice the process under vacuum condition because any air leaks in the process apparatus could result in localized explosive mixtures of hydrogen and air. Still further it would be desirable if this process could be improved to achieve uranium oxide compositions having higher oxide content such as $U_3O_8$ (uranium tritaoctoxide) and still retain the desirable properties of the uranium dioxide rich powder produced in the process described and claimed in the foregoing patent application.

OBJECTS OF THE INVENTION

It is an object of this invention to achieve substantially complete conversion of the reducing gas reactant to its oxidized form in the flame conversion of uranium hexafluoride to a uranium oxide rich composition.

Another object of this invention is to provide a process for the flame conversion of uranium hexafluoride to a uranium oxide rich composition where the resulting oxide of uranium is a function of the volume of the oxygen-containing gas introduced to the reaction.

Still another object of this invention is to provide a process for the flame conversion of uranium hexafluoride to a uranium oxide rich composition which can be more safely practiced using vacuum conditions in the reaction zone to aid in drawing off the reaction products.

A further object of this invention is to provide a process utilizing the heat liberated in the conversion of uranium hexafluoride to a uranium dioxide rich composition for a subsequent conversion of the uranium dioxide rich composition to higher oxides of uranium.

Figure 2:
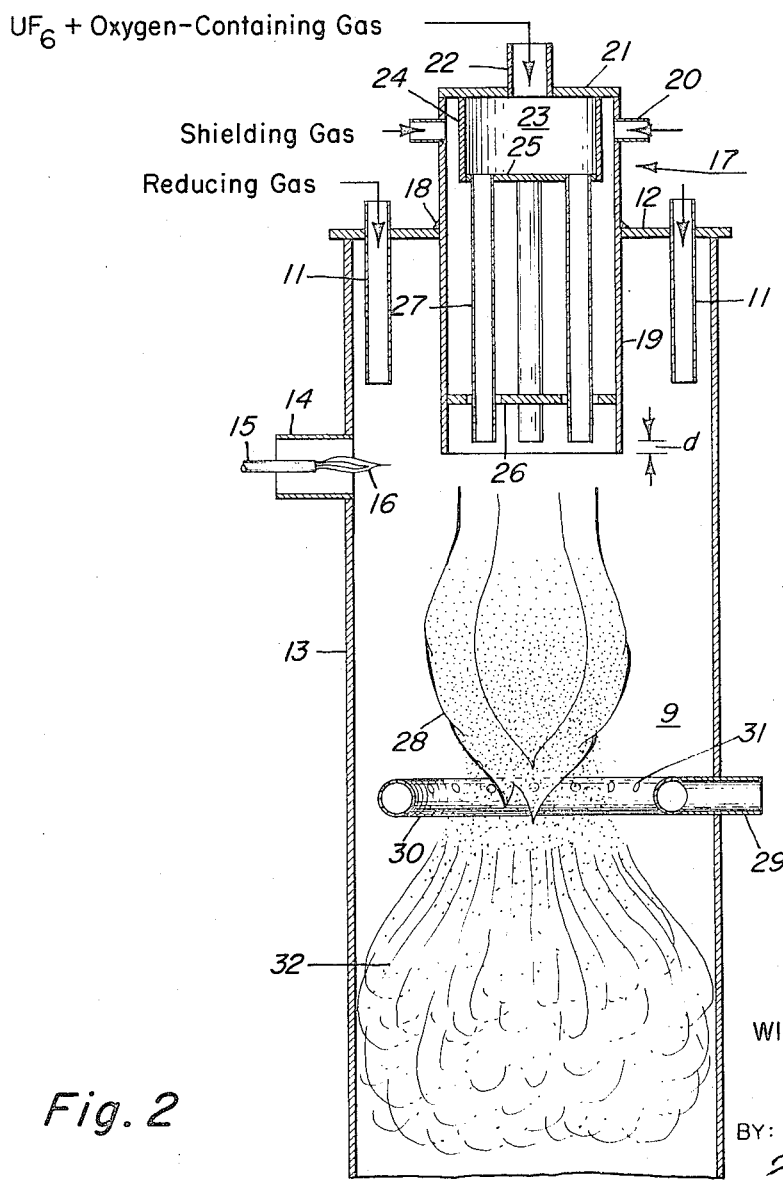

Other objects and advantages of this invention will become apparent to a person skilled in the art from a reading of the following summary, description of the invention and the appended claims and by reference to the accompanying drawings, in which FIGS. 1 and 2 show respectively a top view partially cut away and a sectional side view of the upper portion of one reactor used in the practice of this invention. FIGS. 3 and 4 show respectively a top view partially cut away and a sectional side view of the upper portion of another reactor used in the practice of this invention.

SUMMARY OF THE INVENTION

It has now been discovered that the introduction of an oxygen-containing gas at a time when the uranium hexafluoride conversion to a uranium dioxide rich composition is substantially complete in a reaction zone as described in U.S. patent application Ser. No. 77,446 achieves improvements in the flame conversion of uranium hexafluoride to an oxide product. Any reducing gas in the reaction zone, usually in the form of hydrogen, reacts to form its oxidized product and the uranium dioxide rich composition is converted to a higher oxide of uranium between $UO_2$ and $U_3O_8$ (hereinafter uranium oxide rich composition) with the particular oxide of uranium depending on the molar ratio of oxygen to the uranium dioxide rich composition and the residual reducing gas. This molar ratio can be changed by varying the volume of oxygen-containing gas introduced. This improved process permits a safer practice of the uranium hexafluoride conversion under vacuum conditions. This improved process requires no separate heating step as the temperature of the intermediate reaction products of the uranium dioxide rich composition and residual reducing gas in the reaction zone is sufficient to react the residual reducing gas and the uranium dioxide rich composition with the oxygen-containing gas downstream from the position at which the latter gas is introduced. This is very desirable since raising the temperature at this position in the reaction zone can lead to a partial sintering of the particles of the resulting uranium oxide rich composition. Since fine size particles of oxide are desirable, especially for catalytic applications, the partial sintering is not usually desirable.

DETAILED DESCRIPTION OF THE INVENTION

The foregoing objects have been accomplished in a new process for thermal conversion of gaseous uranium hexafluoride to a uranium oxide rich composition in the presence of an autogenous flame in a reaction zone which separately receives a mixture of uranium hexafluoride and an oxygen-containing carrier gas as a first gaseous reactant, a reducing gas as a second gaseous reactant, a shielding gas temporarily separating the first and second gaseous reactants from one another and temporarily preventing substantial mixing and reaction of the first and second gaseous reactants, and an oxygen-containing gas as a third reactant introduced in the reaction zone at a time and position such that the reaction between the first and second gaseous reactants is substantially complete. The shielding gas temporarily prevents the reducing gas from diffusing into the uranium hexafluoride-carrier gas mixture and also prevents diffusion of the uranium hexafluoride-carrier gas mixture into the reducing gas until the mixture has moved away from the inlet through which the gas mixture is introduced into the reaction zone. After a brief delay, sufficient cross diffusion of the first and second gaseous reactants through the shielding gas occurs and the flame reaction occurs between the uranium hexafluoride, the carrier gas and the reducing gas. This reaction results in a transient formation of a particulate uranium dioxide rich composition and gaseous byproducts including residual reducing gas. The third reactant, an oxygen-containing gas, reacts with the particulate uranium dioxide rich composition and the gaseous byproducts yielding a particulate uranium oxide rich composition and converting any reducing gas to its oxidized form. The particular uranium oxide formed depends on the ratio of the molar volume of the third reactant and the molar volumes of the transient particulate uranium dioxide rich composition and the residual reducing gas.

Referring now to FIGS. 1 and 2, there is shown a reactor generally designated as 10 in which the process of this invention can be carried out. In this embodiment, a first inlet means in the form of two tubes 11 mounted and sealed in cover 12 is used to introduce a reducing atmosphere (the second gaseous reactant referred to above) in the direction of the arrow into the reaction zone 9, such as a reducing gas selected from the group consisting of hydrogen, dissociated ammonia and mixtures thereof. Cover 12 forms a tight seal with vessel 13 and the cover 12 is removable from the vessel 13. Vessel 13 has an outwardly protruding space 14 which holds a pilot burner 15 which receives gas and maintains a pilot flame 16 to initiate a flame reaction.

A portion of the nozzle generally designated as 17 is positioned in a central opening in cover 12 and sealed in an airtight connection by seals 18. The nozzle 17 has a second inlet means in the form of outer tube 19 with two tubular inlets 20 for introducing a shielding gas in the direction of the arrow in each inlet 20. The shielding gas can be a gas non-reactive with the reactants of the process such as a gas selected from the group consisting of nitrogen, argon, helium, neon, krypton, xenon and mixtures thereof or the shielding gas can also be one which enters into the reaction such as air, oxygen or a mixture of air and oxygen, or a mixture of either air, oxygen or air and oxygen with any of the foregoing non-reactive gases. The outer tube 19 has a cover 21 and holds a third inlet means which receives a mixture of uranium hexafluoride and an oxygen-containing carrier such as oxygen, air or a mixture thereof from tubular inlet 22 as the first gaseous reactant referred to above. The mixture flows in the direction of the arrow in inlet 22 and enters the third inlet means which includes a chamber 23 formed by tube 24 which has a bottom portion 25. Bottom portion 25 has circular openings of size equal to the external diameter of tubes 27 which are connected to portion 25 so that tubes 27 receive the gas mixture from chamber 23. Tube 19 extends farther into reaction zone 9 than tubes 27 by the distance generally designated $d$. A shielding gas direction control plate 26 is secured transversely in tube 19, and this plate is provided with openings through which tubes 27 extend coaxially forming an annular opening around each tube 27. This plate 26 forces the shielding gas to pass through the annular opening around each tube 27.

An inlet 29 of a hollow metal pipe made of material such as Monel® opens into a perforated toroidal distributor 30 also made of a material such as Monel and provided with openings 31. Distributor 30 is located downstream from the nozzle means 17 at a position where the uranium hexafluoride conversion to a uranium dioxide rich composition is substantially complete. In FIG. 2 this position is shown as being near the tip of primary flame 28. An oxygen-containing gas is fed in inlet 29 so that it enters the reaction zone 9 from openings 31 in distributor 30 and mixes with the reaction products. This results in a secondary flame 32 from the burning of the residual reducing gas to its oxidized product form and the conversion of the uranium dioxide rich composition to a composition rich in uranium oxide(s) having some oxide in a higher oxygen content than uranium dioxide. The following are representative of such uranium oxide(s): uranium tritaoctoxide ($U_3O_8$), uranium pentoxide ($U_2O_5$), $U_4O_9$ and mixtures of any of the foregoing with or without some uranium dioxide ($UO_2$).

The distributor 30 approximately divides the reaction zone 9 into (1) a primary reaction zone with primary flame 28 including generally the space toward nozzle 17 from distributor 30 and (2) a secondary reaction zone with secondary flame 32 including generally the space below distributor 30 shown in FIG. 2.

It is a preferred practice to introduce the oxygen-containing gas as the third reactant at a sufficient rate so that the ratio of the moles of oxygen [O] so introduced is at least equal to the sum of (1) the moles of oxygen needed for achieving the desired uranium oxide product ($x$) and (2) ½ the number of moles of residual reducing gas ($y$), where the reducing gas is hydrogen, less the sum of the moles of oxygen in the oxygen-containing carrier gas (i.e., chamber 23) and shielding gas ($z$). This gives an equation as follows: $[O]=(x)+(y)-(z)$. In any event the foregoing defines the minimum number of moles of oxygen gas introduced through distributor 30.

Another embodiment of the invention is presented in FIGS. 3 and 4 with the same reference numbers being used to identify the components corresponding to those in FIGS. 1 and 2. In this embodiment the oxygen-containing gas as the third reactant is introduced into reaction zone 9 through tubular members 33 so that the third reactant mixes with the reaction products of the primary flame 28. This results in formation of a secondary flame 32 due to the burning of the residual reducing gas to form its oxidized product and the conversion of the uranium dioxide rich composition to a composition rich in uranium oxides as previously described. The tubular members 33 are mounted so that the incoming third reactant gas enters the reaction zone 9 at the point where the uranium hexafluoride conversion to the transient particulate uranium dioxide rich composition is substantially complete.

Any of the apparatus and process embodiments presented in the aforementioned copending U.S. patent application Ser. No. 77,446 can be utilized in the practice of this invention. Particular reference is made to any of the configurations for reactant inlets, the start up sequences, the preferred molar proportions for gases, the flame temperatures, the preferred use of vacuum conditions and the distance $d$. The start up sequences of the aforementioned application are modified so that when the flow of the oxygen-containing carrier gas is started, the flow of oxygen-containing gas for the post oxidation step is also started. The reactions postulated in the above-identified application are also felt to be applicable to the reactions in the process of this invention prior to the step of subsequently oxidizing or burning the products of flame 28.

The present invention achieves additional advantages by the conversion of uranium hexafluoride to a uranium oxide rich composition. The oxidation of the reaction products of the primary flame 28 achieves substantially complete conversion of the reducing gas (the second gaseous reactant, preferably hydrogen) to its oxidized form (for hydrogen, water vapor). This eliminates any appreciable concentration of the reducing gas at the point of completion of the reaction sequence and this enables use of vacuum conditions to aid in drawing the reaction products from the reaction zone. This invention utilizes the heat liberated in the reaction zone from the primary flame 28 for subsequent conversion of the uranium dioxide rich composition from the primary flame 28 to higher oxides of uranium.

The uranium oxide rich compositions produced in the practice of this invention are in the form of powders having superior properties. The powders contain preferably greater than 95 percent by weight of the uranium oxides as listed above with the balance being largely fluoride ions in the form of hydrogen fluoride and other compounds containing uranium and fluorine not generally identifiable by X-ray diffraction. The powder has excellent surface properties with high relative surface area for the particular composition of the powder. It is believed that these limited impurities in the powder prevent the powder from exhibiting any pyrophoric tendencies because the bond of the hydrogen fluoride with the uranium oxide is not displaced by oxygen. Further, this hydrogen fluoride-uranium oxide bond permits the powder to be handled without skin irritation. These powders can be readily sintered in compacted shapes in controlled atmospheres to achieve up to 99+% of the theoretical density.

Those skilled in the art will gain a further understanding of this invention from the following illustrative, but not limiting, examples of the invention.

EXAMPLE 1

A reactor similar to that shown in FIGS. 3 and 4 is assembled. Two Monel tubes 11 of 0.25 inch outside diameter and 0.18 inch inside diameter are mounted in Monel cover 12 and receive hydrogen gas from a source, here a cylinder. Cover 12 forms a tight seal with Monel vessel 13 of inner diameter of 8.0 inches. Vessel 13 is provided with an outwardly protruding chamber 14 which holds a gas pilot burner 15 which receives natural gas and maintains a pilot flame 16 to initiate the reaction.

A nozzle means 17 is located in a central opening in cover 12 and sealed in an air tight connection by asbestos fiber gasket 18. A source of shielding gas is connected to inlets 20 of Monel tube 19 of 4.00 inches outside diameter and 3.88 inches inside diameter. A mixture of uranium hexafluoride and oxygen is fed into Monel tubular chamber 23 which has an inside diameter of 3.00 inches and an outside diameter of 3.13 inches. Tubes 27 of 0.37 inch inside diameter and 0.50 inch outside diameter are connected at the openings in bottom portion 25. The distance $d$ is 0.25 inch. A Monel shield gas direction control plate is connected to tube 19 at 1.00 inch from the open end of tube 19. Tubular members 33 are Monel pipes of 6 inches inside diameter mounted at a 45° angle to the axis of vessel 13. The center of members 33 is about 15 inches from the open end of tube 19. The vessel 13 is connected to vacuum equipment which draws off the reaction products. The uranium oxide powder is collected while the off gases are treated to condense hydrogen fluoride and water vapor.

The following sequence is used to initiate the conversion of uranium hexafluoride to a uranium oxide rich product. The reaction zone is purged with nitrogen through tube 19 for about five minutes to achieve an atmosphere of substantially nitrogen in the reaction zone 9. After this time the nitrogen flow is stopped and the pilot flame 16 is turned on followed by introduction of air as the shielding gas through tube 19. Next the oxygen-containing carrier gas (here air) is introduced into the reaction zone through chamber 23 and tubes 27 and the oxygen-containing gas (here air) for the post oxidation step is introduced through tubular members 33. Next the reducing gas of dissociated ammonia is introduced to the reaction zone through tubes 11 which gives a bluish flame lifted away from tube 19. After the bluish flame reaches equilibrium and the desired flow rates of gases are reached, the flow of uranium hexafluoride is started to create a mixture with the oxygen-containing carrier gas in tubes 27. At this time the color of the lifted primary flame 28 changes to a bright orange color. The rate of flow of uranium hexafluoride is 14.0 pounds per hour and is conducted for 2.1 hours. The effective molar ratio of hydrogen (from the dissociated ammonia) to uranium hexafluoride is 15.6. The effective molar ratio of oxygen to uranium hexafluoride at the opening of the nozzle into the reaction zone is 4.35 and at the start of the secondary flame 32 is 4.30 giving a total molar ratio of oxygen to uranium hexafluoride of 8.65. The effective molar ratio of hydrogen (from the dissociated ammonia) to oxygen in the process is 1.8. A vacuum is drawn on the reactor of 7.5 inches of mercury during the process.

The reaction proceeds with the unique feature of avoiding contact of the reaction products with the tip of tubes 19 and 27. The flame is lifted or removed from tube 19 approximately ½ inch throughout the run. This means that the formation of the uranium dioxide rich composition in the primary orange flame 28 is occurring without contact of the products of the flame with the tubes 19 and 27. There is a tapering of the laminar primary flame in the reaction zone at a point about adjacent the center of members 33 below which there is a secondary darker orange flame which is turbulent. The run is conducted for 2.1 hours producing 24.4 pounds of about 95% by weight uranium tritaoctoxide ($U_3O_8$) having about 4.0 percent by weight fluoride concentration with the remainder being other oxides and impurities.

EXAMPLES 2-13

The process of Example 1 is repeated using the same general procedure with the variation in the parameters noted in Table 1 below. Table 1 reports in consecutive columns the example number; the rate of flow of uranium hexafluoride in pounds per hour to the reactor; the total time of the processing run; the ratio of the moles of hydrogen from the reducing gas of dissociated ammonia to the moles of uranium hexafluoride; the ratio of the moles of oxygen to moles of uranium hexafluoride introduced to the reaction zone from the nozzle, at the start of the secondary flame and the overall ratio for the reaction zone; the overall ratio of the moles of hydrogen to oxygen introduced to the reaction zone during the run; the vacuum drawn on the reaction zone in inches of mercury; the composition of the shielding gas; the composition of the oxygen-containing carrier gas; and the composition of the third gaseous reactant.

and
(d) introducing the uranium hexafluoride to form a mixture with the oxygen-containing carrier gas with the mixture entering the reaction zone temporarily separated from the reducing gas by the shielding gas.

5. The method of claim 1 where the reaction zone is

TABLE 1

| Example: | $UF_6$ flow, lb./hr. | Time, hr. | Molar ratio, $H_2/UF_6$ | Molar ratio, $O_2/UF_6$ Nozzle | Secondary flame | Total | Molar ratio, $H_2/O_2$ | Vacuum, in. Hg | Shielding gas | Carrier gas | Third gaseous reactant |
|---|---|---|---|---|---|---|---|---|---|---|---|
| 2 | 14.0 | 4.00 | 15.0 | 4.35 | 4.47 | 8.80 | 1.7 | 11.0 | Air | Air | $O_2$. |
| 3 | 10.0 | 6.30 | 15.1 | 3.55 | 4.55 | 8.10 | 1.9 | 10.0 | Air | Air | $O_2$. |
| 4 | 16.6 | 3.75 | 12.7 | 4.75 | 2.65 | 7.40 | 1.7 | 5.0 | Air | Air | $O_2$. |
| 5 | 13.5 | 4.67 | 13.5 | 3.90 | 2.75 | 6.65 | 2.0 | 6.0 | $N_2$ | ½ $O_2$ plus ½ air | Air. |
| 6 | 16.5 | 1.40 | 10.7 | 3.00 | 2.30 | 5.30 | 2.0 | 9.5 | $N_2$ | do | Air. |
| 7 | 17.0 | 3.80 | 10.2 | 3.10 | 2.20 | 5.30 | 1.9 | 9.5 | $N_2$ | do | Air. |
| 8 | 16.0 | 1.80 | 11.0 | 3.30 | 2.30 | 5.60 | 2.0 | 10.0 | Air | Air | Air. |
| 9 | 19.0 | 3.30 | 9.4 | 2.75 | 1.95 | 4.70 | 2.0 | 6.0 | Air | Air | Air. |
| 10 | 20.0 | 3.00 | 10.0 | 3.05 | 1.95 | 5.00 | 2.0 | 6.0 | Air | Air | Air. |
| 11 | 12.0 | 3.80 | 15.7 | 4.60 | 3.25 | 7.85 | 2.0 | 6.0 | Air | Air | Air. |
| 12 | 11.0 | 3.60 | 15.0 | 4.50 | 3.00 | 7.50 | 2.0 | 8.0 | Air | Air | Air. |
| 13 | 15.0 | 2.90 | 12.9 | 3.70 | 2.70 | 6.40 | 2.0 | 8.0 | Air | Air | Air. |

As will be apparent to those skilled in the art, various modifications and changes may be made in the invention as described herein. It is accordingly the intention that the invention be construed in the broadest manner within the spirit and scope as set forth in the accompanying claims.

What is claimed is:

1. In a method of preparing a uranium oxide rich composition from uranium hexafluoride in a reaction zone in the presence of an active flame having the steps of:
   (a) introducing a first gaseous reactant comprising a mixture of uranium hexafluoride and an oxygen-containing carrier gas into the reaction zone,
   (b) introducing a second gaseous reactant comprising a reducing gas into the reaction zone, and
   (c) separately introducing a shielding gas in the reaction zone between the first gaseous reactant and the second gaseous reactant which temporarily prevents substantial mixing and reaction between the first and second gaseous reactants until sufficient cross diffusion of the reactants occurs as the reactants pass through the reaction zone resulting in a reaction producing a particulate uranium dioxide rich composition and gaseous reaction products, the improvement comprising introducing a third gaseous reactant comprising an oxygen-containing gas into contact with the particulate uranium dioxide rich composition and the gaseous reaction products thereby converting the gaseous reaction products in the reaction zone to an oxidized form and oxidizing the uranium dioxide rich composition to a higher oxide of uranium.

2. The method of claim 1 where the method is initiated by the sequential steps of:
   (a) introducing the shielding gas into the reaction zone,
   (b) introducing the oxygen-containing carrier gas for the uranium hexfluoride and the third gaseous reactant into the reaction zone,
   (c) introducing the reducing gas into the reaction zone, and
   (d) introducing the uranium hexafluoride to form a mixture with the oxygen-containing carrier gas with the mixture entering the reaction zone temporarily separated from the reducing gas by the shielding gas.

3. The method of claim 2 in which the oxygen-containing carrier gas and the uranium hexafluoride are introduced simultaneously into the reaction zone.

4. The method of claim 1 where the method is initiated by the sequential steps of:
   (a) introducing the oxygen-containing carrier gas for the uranium hexafluoride and the third gaseous reactant into the reaction zone,
   (b) introducing the shielding gas into the reaction zone,
   (c) introducing the reducing gas into the reaction zone, and
   (d) introducing the uranium hexafluoride to form a mixture with the oxygen-containing carrier gas with the mixture entering the reaction zone temporarily separated from the reducing gas by the shielding gas.

5. The method of claim 1 where the reaction zone is purged with an inert gas prior to introducing the gaseous reactants to the reaction zone.

6. The method of claim 1 wherein the first gaseous reactant comprising a mixture of uranium hexafluoride and an oxygen-containing carrier gas is introduced into the reaction zone as a plurality of individual streams and the streams are surrounded by the shielding gas.

7. The method of claim 1 where the reducing gas is hydrogen, the oxygen-containing carrier gas is oxygen, the third gaseous reactant is oxygen, and the shielding gas is nitrogen.

8. The method of claim 1 where the reducing gas is dissociated ammonia, the oxygen-containing carrier gas is oxygen, the third gaseous reactant is oxygen, and the shielding gas is nitrogen.

9. The method of claim 1 where the reducing gas is hydrogen, the oxygen-containing carrier gas is air, the third gaseous reactant is air, and the shielding gas is air.

10. The method of claim 1 where the reducing gas is dissociated ammonia, the oxygen-containing carrier gas is air, the third gaseous reactant is air, and the shielding gas is air.

11. The method of claim 1 where the reducing gas is hydrogen, the oxygen-containing carrier gas is oxygen, the third gaseous reactant is oxygen, and the shielding gas is air.

12. The method of claim 1 where the reducing gas is dissociated ammonia, the oxygen-containing carrier gas is oxygen, the third gaseous reactant is oxygen, and the shielding gas is air.

13. The method of claim 1 where the reducing gas is hydrogen, the oxygen-containing carrier gas is air, the third gaseous reactant is air, and the shielding gas is nitrogen.

14. The method of claim 1 where the reducing gas is dissociated ammonia, the oxygen-containing carrier gas is air, the third gaseous reactant is air, and the shielding gas is nitrogen.

15. The method of claim 1 where the reducing gas is a mixture of hydrogen and dissociated ammonia, the oxygen-containing carrier gas is a mixture of oxygen and air, the third gaseous reactant is a mixture of oxygen and air, and the shielding gas is a mixture of nitrogen and air.

16. The method of claim 1 where the shielding gas is an inert gas.

17. The method of claim 1 where the reaction occurs in a flame at a temperature of at least about 750° C.

18. The method of claim 1 in combination with the initial step of preheating the reaction zone to an initial temperature of at least about 100° C.

19. The method of claim 1 where the reaction zone is maintained under a vacuum of about 1 to about 25 inches of mercury.

20. The method of claim 1 where the gas stream withdrawn from the reaction zone is treated to collect hydrogen fluoride and water vapor from the gas stream in the form of an aqueous solution of hydrofluoric acid.

21. The method of claim 1 in which the third gaseous reactant is oxygen.

22. The method of claim 1 in which the third gaseous reactant is air.

23. The method of claim 1 in which the third gaseous reactant is a mixture of oxygen and air.

24. The product prepared by the process of claim 1.

25. A method of preparing a uranium oxide rich composition from gaseous uranium hexafluoride in a reaction zone in the presence of an active flame having the steps of:
  (a) introducing a first gaseous reactant comprising a mixture of uranium hexafluoride and an oxygen-containing carrier gas into the reaction zone,
  (b) introducing a second gaseous reactant comprising a reducing gas into the reaction zone,
  (c) separately introducing a shielding gas in the reaction zone between the first gaseous reactant and the second gaseous reactant which temporarily prevents substantial mixing and reaction between the first and second gaseous reactants until sufficient cross diffusion of the reactants occurs as the reactants pass through the reaction zone resulting in a reaction producing a particulate uranium dioxide rich composition and gaseous reaction products, and
  (d) separately introducing a third gaseous reactant comprising an oxygen-containing gas into contact with the particulate uranium dioxide rich composition and the gaseous reaction products thereby converting the gaseous reaction products in the reaction zone to an oxidized form and oxidizing the uranium dioxide rich composition to a higher oxide of uranium.

26. A method of claim 25 in which the third gaseous reactant is introduced at the time when the uranium hexafluoride conversion to the uranium dioxide rich composition is substantially complete.

27. A method of claim 25 where the reducing gas is hydrogen, the oxygen-containing carrier gas is oxygen, the third gaseous reactant is oxygen, and the shielding gas is nitrogen.

28. A method of claim 25 where the reducing gas is dissociated ammonia, the oxygen-containing carrier gas is oxygen, the third gaseous reactant is oxygen, and the shielding gas is nitrogen.

29. A method of claim 25 where the reducing gas is hydrogen, the oxygen-containing carrier gas is air, the third gaseous reactant is air, and the shielding gas is air.

30. A method of claim 25 where the reducing gas is dissociated ammonia, the oxygen-containing carrier gas is air, the third gaseous reactant is air, and the shielding gas is air.

31. A method of claim 25 where the reducing gas is hydrogen, the oxygen-containing carrier gas is oxygen, the third gaseous reactant is oxygen, and the shielding gas is air.

32. A method of claim 25 where the reducing gas is dissociated ammonia, the oxygen-containing carrier gas is oxygen, the third gaseous reactant is oxygen, and the shielding gas is air.

33. A method of claim 25 where the reducing gas is hydrogen, the oxygen-containing gas is air, the third gaseous reactant is air, and the shielding gas is nitrogen.

34. A method of claim 25 where the reducing gas is dissociated ammonia, the oxygen-containing carrier gas is air, the third gaseous reactant is air, and the shielding gas is nitrogen.

35. A method of claim 25 where the reducing gas is a mixture of hydrogen and dissociated ammonia, the oxygen-containing carrier gas is a mixture of oxygen and air, the third gaseous reactant is a mixture of oxygen and air, and the shielding gas is a mixture of nitrogen and air.

36. A method of claim 25 where the shielding gas is an inert gas.

37. A method of claim 25 in which the third gaseous reactant is oxygen.

38. A method of claim 25 in which the third gaseous reactant is air.

39. A method of claim 25 in which the third gaseous reactant is a mixture of oxygen and air.

40. A product prepared by the process of claim 25.

41. A method of claim 25 where the reaction zone is purged with an inert gas prior to introducing the gaseous reactants to the reaction zone.

42. A method of claim 25 wherein the first gaseous reactant comprising a mixture of uranium hexafluoride and an oxygen-containing carrier gas is introduced into the reaction zone as a plurality of individual streams and the streams are surrounded by the shielding gas.

References Cited

UNITED STATES PATENTS

| | | | |
|---|---|---|---|
| 3,365,274 | 1/1968 | Carpenter et al. | 23—202 |
| 3,382,042 | 5/1968 | Richardson et al. | 23—202 |
| 3,260,575 | 7/1966 | Heestand et al. | 23—355 |
| 3,477,830 | 11/1969 | Hackstein et al. | 23—355 |

FOREIGN PATENTS

41/10,095   5/1966   Japan.

OTHER REFERENCES

Galkin et al.: Technology of Uranium, 1966, pp. 20–21.

CARL D. QUARFORTH, Primary Examiner

R. L. TATE, Assistant Examiner

U.S. Cl. X.R.
423—19, 260, 261

UNITED STATES PATENT OFFICE
CERTIFICATE OF CORRECTION

Patent No. 3,790,493     Dated   February 5, 1974

Inventor(s) Abdul G. Dada, William R. DeHollander, and Robert J. Sloat

It is certified that error appears in the above-identified patent and that said Letters Patent are hereby corrected as shown below:

Column 1, line 64, after "hydrogen" insert --fluoride--. Column 3, lines 50 and 53, "byproducts" should be --by products--. Column 6, line 23, after "flow" insert --in the reaction zone 9--. Claim 2, line 5, "hexfluoride" should be --hexafluoride--. Claim 33, line 2, after "oxygen-containing" insert --carrier--.

Signed and sealed this 29th day of October 1974.

(SEAL)
Attest:

McCOY M. GIBSON JR.
Attesting Officer

C. MARSHALL DANN
Commissioner of Patents